April 22, 1924.

J. W. ATKINSON 1,491,074

JOURNAL BOX

Filed Nov. 25, 1921 2 Sheets-Sheet 1

Inventor

John W. Atkinson,

By William L. Symons

Attorney

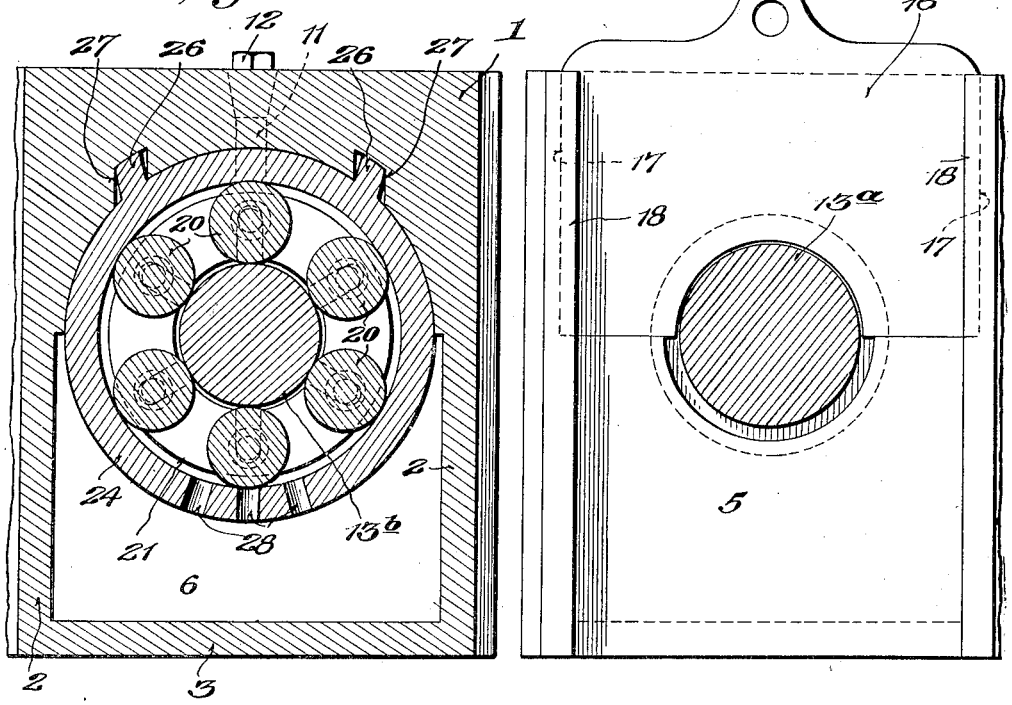
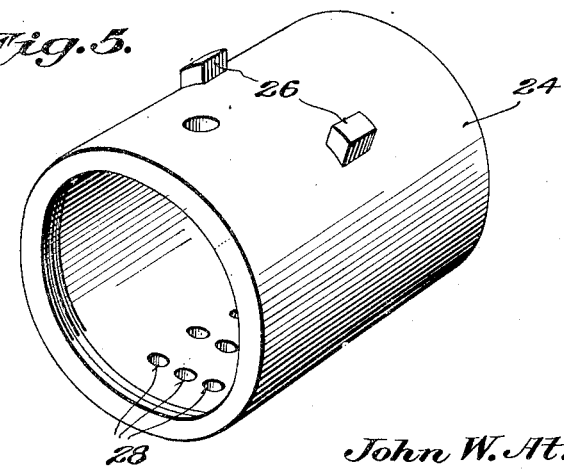

Patented Apr. 22, 1924.

1,491,074

UNITED STATES PATENT OFFICE.

JOHN W. ATKINSON, OF FLORENCE, SOUTH CAROLINA.

JOURNAL BOX.

Application filed November 25, 1921. Serial No. 517,701.

*To all whom it may concern:*

Be it known that JOHN W. ATKINSON, a citizen of the United States of America, residing at Florence, in the county of Florence and State of South Carolina, has invented certain new and useful Improvements in Journal Boxes, of which the following is a specification.

My invention relates to an improved journal box.

Among the objects of my invention are; first, to construct a box in which a float, a brass and packing, such as are usually required in journal boxes, are not used; second, to reduce the number of parts required in a box; third, to simplify the construction of a box in order to cut down the cost of manufacture and to enable worn-out and broken parts to be easily replaced; fourth, to provide a box in which the maximum of wear of the parts is obtained; fifth, to construct a box which will enable the journal bearings to be taken out of the box easily and with very little work, and sixth, to materially reduce the usual cost of lubricating the journal.

With these and other objects in view, one embodiment of my invention is shown in the accompanying drawings in which—

Figure 3 is a section on lines $3^x$—$3^x$ of Figure 1.

Figure 4 is a view along the lines $4^x$—$4^x$, and

Figure 5 is a perspective of the roller bearing casing.

Figure 1:
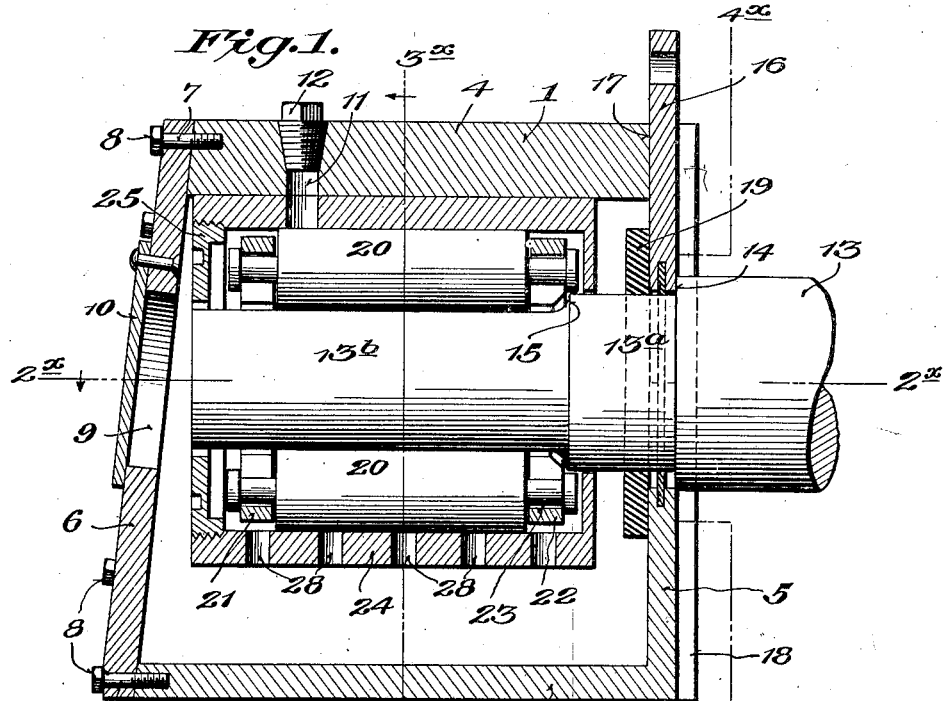
Figure 1 is a longitudinal sectional view through the journal box.
Figure 2:
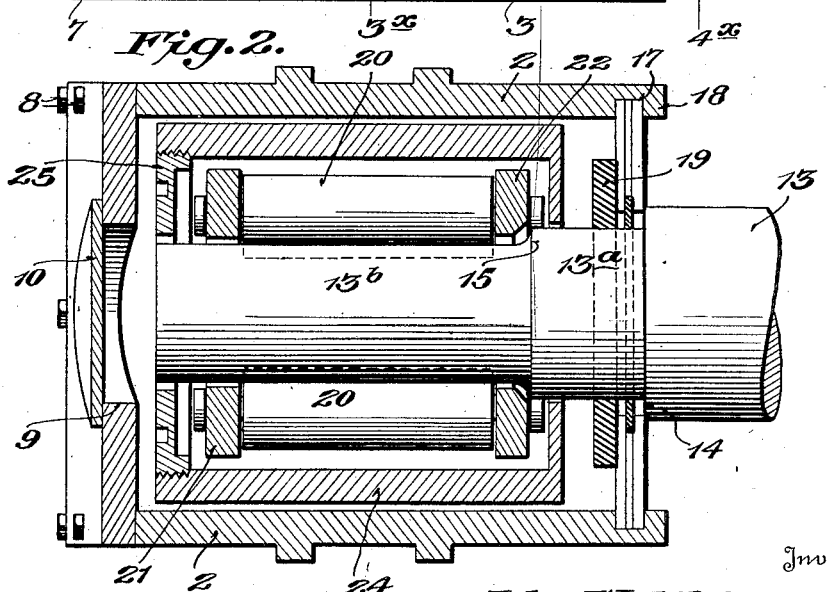
Figure 2 is a section on lines $2^x$—$2^x$ of Figure 1.

The body 1 of my box is made of any suitable material such as cast-iron, and the sides 2, bottom 3, top 4 and a part of the back 5 are integral. The front of the box is closed by a plate 6, which is attached to the body by bolts 7 sunk in the body and having nuts 8 on the ends thereof. This plate may have under it a suitable gasket or other means, not shown, to make the box oil-tight. In order to inspect the inside of the box the plate 6 has therein an opening 9, the bottom of which is on about the same level as the bottom of the end of the journal. This opening is closed by a pivoted door 10. Oil may be put into the box by means of the opening 9, or by an opening 11 in the top of the box closed by a block 12.

The usual journal 13 which has shoulders 14 and 15 thereon extends through the box to near the front thereof. A dust guard 16 slides in groove 17 in flanges 18 on the sides of the box. A rubber or felt washer 19 fits over the part $13^a$ of the journal as an additional protection for the inside of the box from dust.

The part $13^b$ of the journal is surrounded by any suitable number of solid roller bearings 20 made of suitable material, such as case hardened steel, six being shown in the form of box disclosed, the ends of which are spaced apart by two guides 21 and 22 which are practically duplicates and in which are suitable grooves 23 for the ends of the rollers. The rollers are enclosed by a casing 24 which may be made of the same material as the bearings. The front of the casing is closed by a disc 25, screw-threaded in the casing, the disc having an opening closed by the end of the journal. The only openings into the casing are, therefore, closed by part $13^a$ of the journal and the end $13^b$ of the journal. The casing is prevented from revolving by lugs 26 fitting into sockets 27 in the crown part of the box body.

It is the usual practice to fill the box with oil to about the bottom of the opening 9, lubrication of the rollers being facilitated by openings 28.

The box may be dismantled and the casing may be taken out by raising the box with the usual jack used for such purposes far enough to allow the lugs 26 to clear their sockets 27. It will be noted that the journal seat in the rear wall is made large enough for the journal to assume the proper angle to release the lugs from their sockets (see Figure 4).

The form of box illustrated is used on a pedestal truck, but the box may be made to be used with other kinds of trucks.

Having described my invention what I claim and desire to protect by Letters Patent is:

In a structure of the character described, the combination of a journal, a box body surrounding the end of said journal, the top, bottom, sides, and a part of the rear end thereof being integral, a one-piece casing in said body, lugs on said casing, sockets in the crown of said box body for the insertion therein of said lugs when said structure is assembled whereby motion of said casing is prevented, said casing having closures at the ends thereof, said closures having openings therein for the journal to pass through, roller bearings in said casing surrounding the end of said journal, a guide at each end of said rollers, said guides comprising discs with grooves therein for the insertion of the ends of said rollers, a removable plate to close the front end of said box, said plate having an opening therein whereby the interior of said box may be inspected, and a removable closure for the rear end of said box.

In testimony whereof I affix my signature.

JOHN W. ATKINSON.